United States Patent [19]

Plessing

[11] 4,101,113
[45] Jul. 18, 1978

[54] STOPCOCK WITH ROTARY AND ADJUSTABLE PLUG IN THE STOPCOCK HOUSING

[75] Inventor: Kurt Plessing, Lindau, Fed. Rep. of Germany

[73] Assignee: Fördertechnik Streicher GmbH, Bad Schussenried, Fed. Rep. of Germany

[21] Appl. No.: 702,724

[22] Filed: Jul. 6, 1976

[30] Foreign Application Priority Data

Jul. 3, 1975 [DE] Fed. Rep. of Germany ....... 2529641

[51] Int. Cl.² .................................................. F16K 5/00
[52] U.S. Cl. .................................. 251/214; 251/161; 251/309; 251/317; 251/335 A
[58] Field of Search ............... 251/335 A, 312, 309, 251/317, 214, 161; 277/11, 117, 118

[56] References Cited

U.S. PATENT DOCUMENTS

| 713,052 | 11/1902 | Bordo | 251/161 |
|---|---|---|---|
| 2,032,316 | 2/1936 | Cotton | 251/335 A |
| 2,069,013 | 1/1937 | Nordstrom | 251/335 A |
| 2,647,720 | 8/1953 | Volpin | 251/309 |
| 2,994,504 | 8/1961 | Reed, Jr. | 251/312 |
| 3,004,783 | 10/1961 | Webb | 277/118 |
| 3,128,987 | 4/1964 | O'Connor | 251/312 |
| 3,171,492 | 3/1965 | Cochran | 277/117 |
| 3,192,942 | 7/1965 | Manor et al. | 251/214 |
| 3,508,573 | 4/1970 | Smith | 251/309 |
| 3,614,056 | 10/1971 | Alvarez | 251/214 |

FOREIGN PATENT DOCUMENTS

| 393,462 | 8/1908 | France | 277/118 |

*Primary Examiner*—William R. Cline
*Assistant Examiner*—H. Jay Spiegel
*Attorney, Agent, or Firm*—Max Fogiel

[57] ABSTRACT

A stopcock with a plug which is rotary and adjustable in the housing. A fixedly mounted liner of flexible material with a smooth sliding surface is mounted in a rotary manner at a bottom part of the housing. A packing disk is clamped between inside and outside edges in the working area of a shank and projects to the outside. A gasket is located in a cylindrical annular space formed between the shank and a wall fixed to the housing. The reset force of a reset member projecting into the annular space, acts via the gasket and the packing disk on the stopcock bottom part for resetting in its conical seat in the liner. The gasket is enclosed on all sides and is supported by the packing disk by means of a pressure-proof prop ring having reset play restricted by a fixed stop on the housing. Between the gasket and the reset member, is a thrust ring tightly fitted to the wall fixed to the housing, and is centered on the stopcock shaft between the gasket and the prop ring.

9 Claims, 1 Drawing Figure

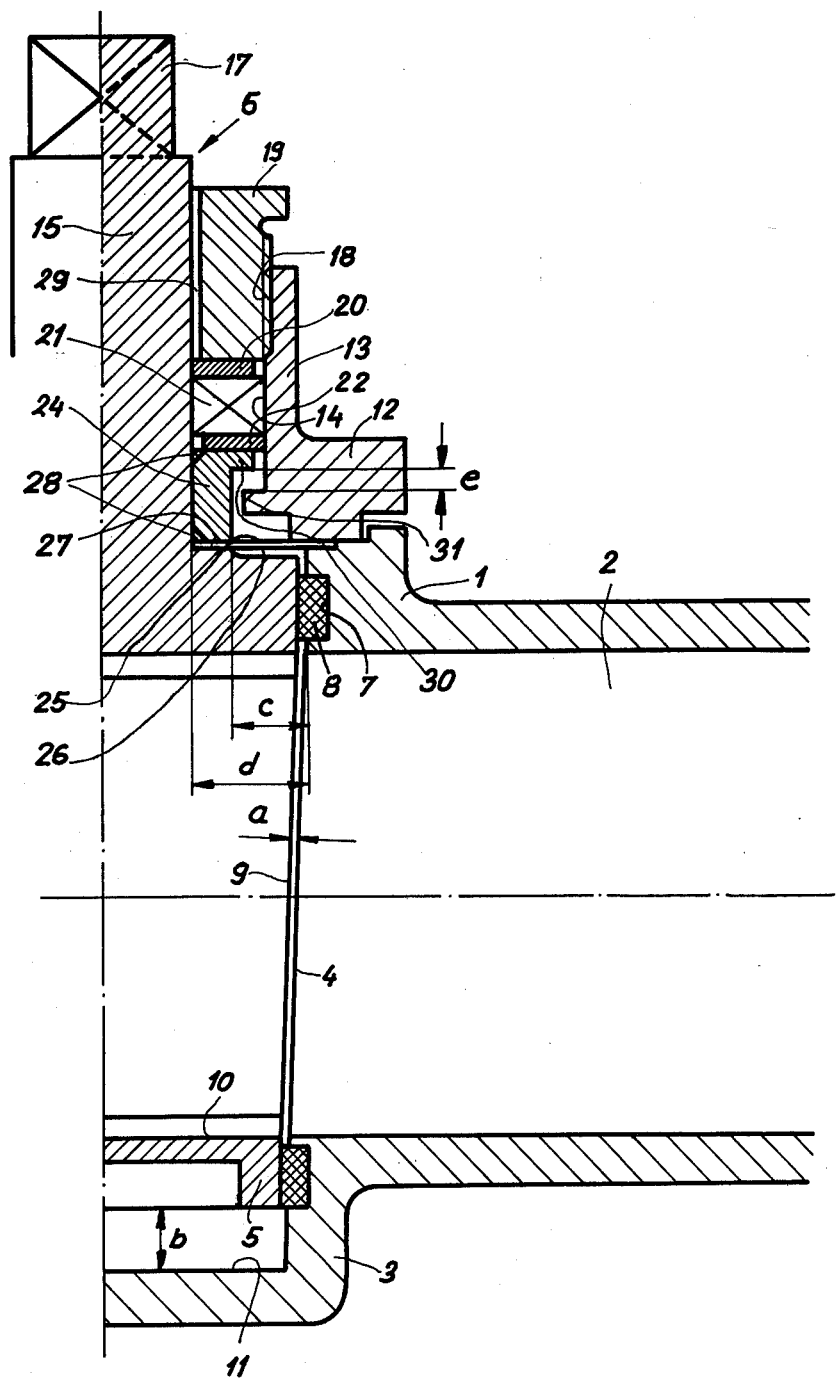

STOPCOCK WITH ROTARY AND ADJUSTABLE PLUG IN THE STOPCOCK HOUSING

BACKGROUND OF THE INVENTION

The present invention relates to a stopcock with a plug which is rotary and adjustable in the cock housing. The stopcock bottom part has a fixedly mounted liner of elastic or flexible material with a smooth surface such as polytetrafluorethylene (PTFE) and is mounted in a rotary fashion, with a packing disk, which is clamped between inside and outside edge in the working area of a stopcock shank projecting to the outside and located between stopcock and housing. A gasket is located in a cylindrical annular space formed between the stopcock shank and a wall fixed to the housing. The reset force of a rest organ projecting into the annular space acts via the gasket and the packing disk on the stopcock bottom part for resetting the latter in its conical seat in the liner.

With a stopcock known from German Laid-Open Document No. 1,959,617, the stopcock shank protrudes through a ring-shaped housing cover to the outside and can be turned by a lever, a handwheel, etc. For sealing the cock housing from the stopcock shank, a packing disk is clamped between the housing and the ring cover. This packing disk extends to the inside up to a shoulder surface of the cock plug and is covered by a prop ring which permits resetting of the plug in relation to its conical seat by screws mounted in the cover. This resetting is necessary from time to time, since the soft material of the liner wears in usage. Even if the wear has progressed so far that finally the stopcock component contacts the metal surfaces of the cock housing, the sealing in the direction of flow is still sufficient. A further resetting of the stopcock, however, would restrict its rotary adjustability and might possibly result in seizing. As a rule, in this extreme reset position, there is no longer a reliable seal with respect to the stopcock shank. Because of the small conical slope at the stopcock seat, a relatively large reset path is required. Throughout this large reset displacement, the packing disk must be axially deformed between its outer and inner annular clamping location, so that it easily tears, or at any rate is damaged so that liquid may leak to the outside.

In another stopcock design with liner in accordance with U.S. Pat. No. 2,913,219, a packing is located between the stopcock shank and the wall fixed to the housing. However, it acts directly on the packing disk adjoining the stopcock bottom part, and, under pressure, may expand into an annular space provided at the top of this packing disk. Again, all reset forces are always transmitted to the stopcock bottom part, so that the aforementioned disadvantages appear; in addition, the packing material can easily relax and the sealing effect decreases continually.

It is, therefore, an object of the present invention to provide a stopcock of the initially described type in such a way that even with extreme wear of the liner, without a further resetting of the cock plug, leakage of liquid along the stopcock shank is reliably prevented during an extended period of usage.

Another object of the present invention is to provide a stopcock which may be economically fabricated and maintained in service.

A further object of the present invention is to provide a stopcock, as described, which has a substantially long operating life.

SUMMARY OF THE INVENTION

The objects of the present invention are achieved by providing that the gasket is enclosed on all sides and is supported by the packing disk by means of a pressure-proof prop ring whose reset play is restricted by a fixed stop on the housing.

Before the prop ring contacts its stop, all reset forces exerted on the gasket are also acting via prop ring and packing disk on the stopcock bottom part which thus can compensate the wear on the liner. However, shortly before the liner is worn to such a degree that metal contact of the stopcock bottom part with the cock housing is imminent, the rest path of the prop ring is terminated by contact with the associated stop fixed to the housing. When the liner is worn further, its sealing effect is reduced; however, because of the small remaining gap between stopcock bottom part and cock housing, this has no deleterious effect on the function of the cock. The gasket enclosed on all sides continues to function and can be placed under pressure as desired in relation to the prop ring now held in a fixed manner and ensure sealing of the stopcock shank even when the packing disk has been destroyed. However, the hazard of destruction or damage to the packing disk is reduced by restricting the reset path, since its axial deformation is limited to a tolerable amount.

The sealing effect is further improved by placing between the gasket and the reset organ, a thrust ring centered on the stopcock shank and between the gasket and the prop ring and fitting tightly along the wall fixed to the housing. This prevents flowout of packing material on the inside and outside on two axially displaced locations, even with exceedingly high reset pressure. Inside at the bottom, the prop ring and on top on the outside the reset organ prevents flowout (leakage), especially when the rest organ is a threaded ring screwed into the wall fixed to the housing.

The prop ring centered on the stopcock shaft on the packing side may have an outside shoulder whose reset track holds an inside shoulder of the wall fixed to the housing.

In accordance to another improvement, the prop ring on the inside face has two tapered ring-shaped recesses holding axially loaded centering rings of triangular cross-section. These centering rings can have additional sealing functions since they are pressed by radial pressure into the tapered ring shaped recesses. In the unloaded condition, they should have, at least in the axial direction, somewhat greater dimensions than the recesses in order to make possible the tightening (stresses) in the sealing material. Like the packing, they may be made of an elastically deformable material, e.g., the same material as the liner, i.e., PTFE.

The wall fixed to the housing may be formed by a cylindrical surface which is part of the cock housing. It is expediently given the form of a ring cover which is fastened to the cock housing and sealed by the packing disk, which is preferably made of PTFE.

For protection against mechanical damage, this packing disk should be covered by a metal diaphragm, preferably made of steel.

It also appears important that the distance spacing the clamping locations of the packing disk between housing and ring cover, on the one hand, and stopcock bottom section and prop ring on the other hand, is at least half the radial spacing between the clamping location, on the housing, and the stopcock shank. The greater this distance, the smaller the deformation angle between the inner and outer clamping location for a given reset path, and hence the smaller the mechanical stress on the packing disk.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

An elevational sectional view through a preferred embodiment of a cock in accordance with the present invention.

DESCRIPTION OF THE PREFERRED EMBODIMENT

Referring to the drawing, there is shown the cock housing with a cylindrical port 2. The potlike expanded center section 3 of the cock housing has a frustrum-shaped finely machined seating surface 4 for the stopcock component 5 of cock plug 6. A liner 8 is seated in a recess 7 of the cock housing. This liner also has the shape of a frustrum with two facing cylindrical openings in the vicinity of port (or flow channel) 2. It is preferably made of PTFE. Towards the inside, it projects by distance $a$ beyond the receiving area 4 of the cock housing and thus forms the conic seating surface 9 for the stopcock bottom part whose flow opening 10 has the same dimensions as flow channel 2. The distance $a$, the conic rise of the seating surface and the distance $b$ of the lower stopcock end from the bottom surface 11 of a adjusting (resetting) cutout in the initial condition shown in the drawing, are arranged so that they correspond to the function $\sin \alpha = a : b$. During the reset process, the stopcock would simultaneously seat on surfaces 4 and 11.

At the open upper end of the pot-shaped expanded center section 3 of the cock housing, a ring cover 12 with a high throat section 13 is fastened with screws (not shown). The cylindrical inside wall 14 of the throat section forms, together with the outside surface of the stopcock shank 15, a cylindrical shell 16. The free end of the stopcock shank has a square end for attaching a lever, handwheel or similar item, and a female thread 18 is cut into the upper end of wall 14. Into this female thread, a reset ring 19 is threaded from the outside; this reset ring presses via a first thrust ring 20, a gasket 21, a second thrust ring 22, a prop ring 24, a steel diaphragm 25 and a packing ring 26 against the ring shoulder of the stopcock bottom part 5. The gasket 21, as well as packing disk 26 and the two centering rings 28 are made of PTFE. The two thrust rings 20 and 22 may be made of steel.

The first thrust ring 20 is seated tightly on the stopcock shaft and thus prevents penetration of the squeezed-out mass of gasket 21 into the annular space 29 between reset ring and stopcock shaft. The second thrust ring 22 fits snugly along the wall 14 of the ring cover and secures the gasket against the bottom and the outside. Since gasket material cannot penetrate into the thread between reset ring and ring cover, and the flow is restricted on the inside at the bottom by the upper centering ring 28, the gasket is secured on all four edges against being squeezed out.

The prop ring 24 on the face side interior has conic slants (slopes) into which fit the centering rings 28 which have about the same cross-section. In the untensioned state, the axial dimension of a centering ring is slightly larger than the axial depth of the associated slant. As a result, the centering rings are tensioned on all sides by the applied axial pressure. Besides centering the prop ring on two ring surfaces, the centering rings bring about a sealing with respect to the stopcock shank. An exact centering of the ring cover in relation to the housing is neither required nor provided and is not necessary with respect to the stopcock shaft. A restricted centering is, at any rate, achieved by the pressure of gasket 21.

Steel diaphragm 25 and packing disk 26 are clamped on the outside edge in a housing groove between cock housing and ring cover, on the inside edge between the shoulder 27 and the prop ring 24. Since the tension forces on the outer edge are much larger than on the inside, when turning the plug by 90° maximum, a sliding process takes place on both sides. Outside the clamping location on prop ring 24, a recess (slot) 29 follows shoulder 27. The distance $c$ between the two clamping locations is about 65 to 70% of the distance $d$ of the outer clamping location from the stopcock shank.

The upper face-side end of prop ring 24 has an outside shoulder 30 in whose reset track an inside shoulder 31 of the ring cover is located distance $e$ away. This distance is much smaller than the distance $b$ between cock plug and the bottom surface 11 of the housing. This ensures that the annular shoulders 30 and 31 during the reset process make contact with each other before the stopcock hits the bottom surface 11 or the stopcock hits the metallic seating surface 4 of the cock housing. The contact (striking) position also limits the deformation on packing disk 26 and steel diaphragm 25, thus reducing the hazard of damage to these parts. After reaching this contact position, adequate sealing against flow in flow channel 2 can be achieved by means of the sleeve 8 in the locked position of the stopcock. However, if along the packing disk 26 and the two centering rings 28 a leakage flow path develops, one can thread the reset ring 19 against the blocked thrust ring 22 and thus prevent the medium to be controlled from flowing out along the stopcock shaft for quite some time. The effective lifetime of the cock between replacement of a sleeve can be doubled in this manner.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

I claim:

1. A stopcock comprising in combination, a housing; a rotary and adjustable plug in said housing; a fixedly mounted liner of flexible material with a substantially smooth sliding surface at a bottom part of said housing; a shaft member displaceable for controlling the flow through said stopcock; a packing disk clamped at its outer edge to said housing and pressed tightly at its inner periphery to an upper surface of the said plug; a gasket located in a cylindrical annular space formed between said shaft member and a wall of said housing; a reset member projecting into the annular space, said reset member being reciprocably received in said annular space for resetting the stopcock, a reset force of said reset member acting via said gasket and packing disk on the stopcock bottom part for resetting in a conical seat in said liner; a fixed stop on said housing, a substantially rigid ring-shaped member movable reciprocably in said annular space in response to reciprocable movement of said reset member, said fixed stop limiting the reciprocable movement, said gasket being enclosed on all sides and acting onto said packing disk through said ring-shaped member; said ring-shaped member having a reciprocable path between said reset member and said plug limited in the reset direction by said fixed stop, said ring-shaped member transmitting reset forces to said plug, said ring-shaped member being stopped by said fixed stop when said liner has received a predetermined amount of wear, further reciprocation by said reset member compressing further said gasket.

2. The stopcock as defined in claim 1 including a thrust ring between said gasket and said reset member and tightly fitting to said shaft member and being centered on said shaft member between said gasket and said ring-shaped member for preventing seepage from said gasket into the annular space.

3. The stopcock as defined in claim 1 including an outside shoulder on said ring-shaped member, said ring-shaped member being centered on said shaft member, said shoulder having a reset path of motion, said wall having an inside shoulder located in said reset path of motion.

4. The stopcock as defined in claim 1 including centering rings having a triangular cross-section; said ring shaped member having on an inside face two tapered ring-shaped recesses holding axially in loaded position said centering rings.

5. The stopcock as defined in claim 1 including a metal diaphragm covering said packing disk.

6. The stopcock as defined in claim 1 including a ring cover; a radial distance between clamping locations of said packing disk between said housing and said ring cover, on the one hand, and a part of said plug and ring-shaped member on the other hand, being at least half the radial distance between clamping locations fixed on said housing and said shaft member.

7. The stopcock as defined in claim 1 wherein said liner is comprised of polytetrafluorethylene (PTFE).

8. The stopcock as defined in claim 5 wherein said metal diaphragm is comprised of steel.

9. The stopcock as defined in claim 1 including a thrust ring between said gasket and said reset member and tightly fitting to said shaft member and being centered on said shaft member between said gasket and said ring-shaped member for preventing seepage from said gasket into the annular space; an outside on said ring-shaped member, said ring-shaped member being centered on said shaft member, said shoulder having a reset path of motion, said wall having an inside shoulder located in said reset path of motion; centering rings having a triangular cross-section; said ring-shaped member having on an inside face two tapered ring-shaped recesses holding axially in loaded position said centering ring; a metal diaphragm covering said packing disk; a ring cover; a radial distance between clamping locations of said packing disk between said housing and said ring cover, on the one hand, and a part of said plug and ring-shaped member, on the other hand, being at least half the radial distance between clamping locations fixed on said housing and said shaft member, said liner being comprised of polytetrafluorethylene, said metal diaphragm being comprised of steel.

* * * * *